United States Patent
Orsini et al.

(10) Patent No.: US 9,809,341 B2
(45) Date of Patent: Nov. 7, 2017

(54) COUNTERBALANCED SERVO END SEAL CARRIAGES

(71) Applicant: Sealed Air Corporation (US), Elmwood Park, NJ (US)

(72) Inventors: Thomas Orsini, Sterling, MA (US); Robert Simonelli, Worcester, MA (US); Michael A. Kalinowski, Nashua, NH (US)

(73) Assignee: Sealed Air Corporation (US), Charlotte, NC (US)

( * ) Notice: Subject to any disclaimer, the term of this patent is extended or adjusted under 35 U.S.C. 154(b) by 874 days.

(21) Appl. No.: 14/062,049

(22) Filed: Oct. 24, 2013

(65) Prior Publication Data
US 2015/0113914 A1    Apr. 30, 2015

(51) Int. Cl.
*B65B 9/087* (2012.01)
*B65B 59/02* (2006.01)
(Continued)

(52) U.S. Cl.
CPC .............. *B65B 59/02* (2013.01); *B29C 65/18* (2013.01); *B29C 66/4312* (2013.01); *B29C 66/73921* (2013.01); *B29C 66/81427* (2013.01); *B29C 66/8225* (2013.01); *B29C 66/8246* (2013.01); *B29C 66/83543* (2013.01); *B29C 66/849* (2013.01); *B65B 9/067* (2013.01); *B65B 51/306* (2013.01); *B65B 65/02* (2013.01);
(Continued)

(58) Field of Classification Search
CPC ....... B65B 51/303; B65B 9/087; B65B 9/067; B65B 59/02; B29C 66/4312; B29C 66/73921; B29C 66/8225; B29C 66/8246; B29C 65/18

USPC .......................................................... 53/553
See application file for complete search history.

(56) References Cited

U.S. PATENT DOCUMENTS

| | | | |
|---|---|---|---|
| 4,019,307 A | * | 4/1977 | Ballestrazzi ........ B29C 66/8225 53/553 |
| 4,307,406 A | | 12/1981 | Ruffell |
| 4,429,514 A | | 2/1984 | Lancaster et al. |

(Continued)

FOREIGN PATENT DOCUMENTS

WO          90/12737 A1    11/1990

OTHER PUBLICATIONS

Proceedings of ISMA 2006, International Conference on Noise and Vibration Engineering, Sep. 2006, pp. 3699-3714, "Counterweight balancing for machine frame vibration reduction: design and robustness analysis", Verschuure, et al., http://www.isma-isaac.be/publications/PMA_MOD_publications/ISMA2006/3699_3714.pdf.

*Primary Examiner* — Robert Long
*Assistant Examiner* — Xavier A Madison
(74) *Attorney, Agent, or Firm* — Jon Isaacson

(57) ABSTRACT

A sealing machine having a movable carriage assembly which utilizes a counterbalance and two servo motors is disclosed. The counterbalance allows high throughput operation without excessive mechanical vibration. The use of two servo motors allows independent control of the horizontal movement of the movable carriage assembly and the vertical movement of the jaws. The use of two servo motors also allows adaptation to articles or packages of various dimensions. In some embodiments, an optical sensor is used to detect the position of the package to be sealed, and the movement of the movable carriage assembly and the jaw is altered based on the detected position.

16 Claims, 10 Drawing Sheets

(51) Int. Cl.

| | |
|---|---|
| *B65B 51/30* | (2006.01) |
| *B65B 65/02* | (2006.01) |
| *B65B 9/067* | (2012.01) |
| *B29C 65/18* | (2006.01) |
| B29C 65/74 | (2006.01) |
| B29C 65/00 | (2006.01) |

(52) U.S. Cl.
CPC ........... *B29C 65/74* (2013.01); *B29C 66/1122* (2013.01); *B29C 66/81419* (2013.01)

(56) References Cited

U.S. PATENT DOCUMENTS

| | | | |
|---|---|---|---|
| 4,660,283 A | | 4/1987 | Yasunaka |
| 5,329,745 A | * | 7/1994 | Suga ................... B65B 9/067 53/450 |
| 5,330,171 A | | 7/1994 | Murad et al. |
| 5,718,145 A | | 2/1998 | Grabbe |
| 5,755,923 A | * | 5/1998 | Kleinhenz ............... B29C 65/18 156/368 |
| 5,956,931 A | * | 9/1999 | Stork ..................... B65B 9/067 53/550 |
| 6,050,065 A | * | 4/2000 | Bonde ................... B29C 65/02 53/371.6 |
| 6,085,488 A | | 7/2000 | Turfan et al. |
| 6,107,770 A | | 8/2000 | Jackson et al. |
| 6,526,728 B1 | | 3/2003 | Sorenson et al. |
| 6,526,732 B2 | * | 3/2003 | Liao ..................... B29C 65/18 53/371.6 |
| 7,164,251 B2 | | 1/2007 | Morishita |
| 7,252,490 B2 | | 8/2007 | Wymbs |
| 7,263,815 B2 | * | 9/2007 | Ballestrazzi ........... B65B 9/067 53/450 |

\* cited by examiner

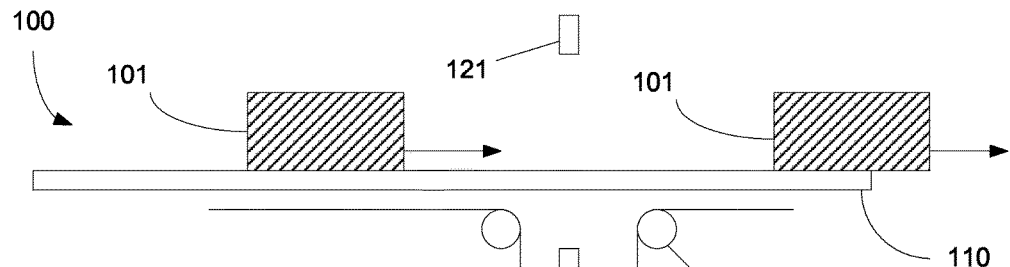
FIG. 2A
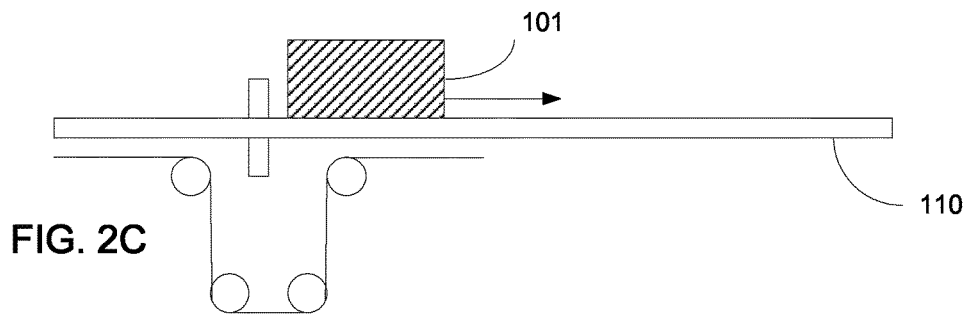
FIG. 2B
FIG. 2C
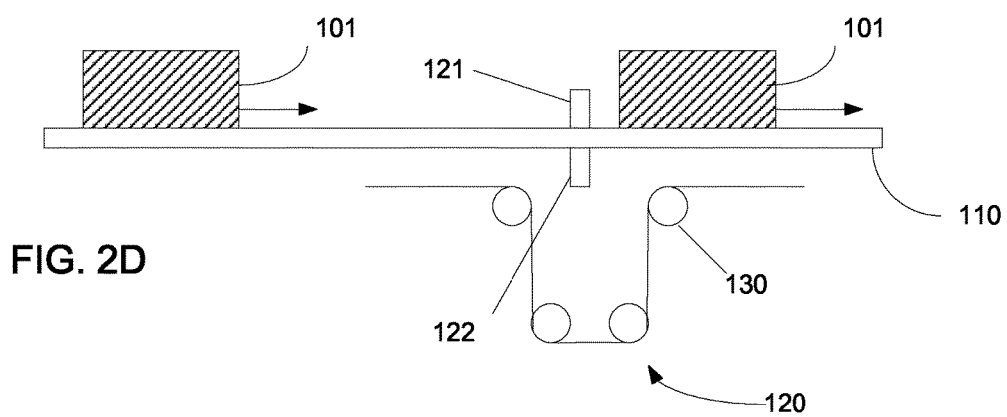
FIG. 2D

COUNTERBALANCED SERVO END SEAL CARRIAGES

BACKGROUND OF THE INVENTION

Machines used to wrap and seal articles and packages in thermoplastic film are well known in the art. Two types of machines are commonly referred to as side-sealing and lap-sealing machines. In the typical side-sealing configuration, an article or set of articles travels, typically via a conveyer belt, toward the machine. A sheet of center-folded plastic film, having two layers, is fed from a direction, which is preferably perpendicular to the direction of the conveyer. The two layers of the film are then separated such that the article is placed between the lower layer and the upper layer. On one side of the article is the center-fold, while on the other side, there is an open edge where the two layers are not attached. The machine has several sets of belts to hold and guide the film, and a side sealing mechanism, which typically comprises a heating/sealing element that fuses or welds the two layers together and a cutting element that removes the excess material. In some embodiments, the heating element serves to cut the film as well. These elements, whether a unitary element or separate components, are referred to as the heating/sealing/cutting element throughout this disclosure. Thus, as the article passes by the side sealing mechanism, this open edge is sealed by welding the two layers together, the plastic is cut and the waste is removed and discarded. At this point, the plastic film resembles a tube, with openings at both the leading and trailing ends of the article, but sealed along both sides. As the article continues to advance, an end sealing mechanism is then employed to seal the film at the leading end of the article. The article is then advanced and the end sealing mechanism then seals the film at the trailing end of the article.

In some embodiments, the end sealing mechanism includes two heated elements which move together to simultaneously cut and seal the plastic film. In some cases, it may be desirable to allow the two heated elements to remain in contact with the film for an extended time to achieve a high quality seal. However, slowing or stopping the conveyor belt to allow this extended seal time adversely impacts throughput. Therefore, in some embodiments, the end sealing mechanism is capable of moving in the horizontal direction. This may be achieved by creating a movable carriage assembly. By moving the carriage in the upstream direction, the heated elements can be brought together earlier, and then can move together downstream with the article.

However, the motion of the movable carriage presents several challenges. First, the carriage may weigh in excess of 50 pounds, so the speed at which it moves back and forth may cause mechanical vibration in the sealing machine. Secondly, the movable carriage complicates the sealing machine, as motion in two directions, horizontal and vertical, must be synchronized.

Therefore, it would be beneficial if there were a sealing machine having a movable end seal carriage that could operate at high throughput speeds and adapt readily to different sized articles.

SUMMARY OF THE INVENTION

The problems associated with the prior art have been overcome by the present invention, which describes a sealing machine having a movable carriage assembly which utilizes a counterbalance and two servo motors. The counterbalance allows high throughput operation without excessive mechanical vibration. The use of two servo motors allows independent control of the horizontal movement of the movable carriage assembly and the vertical movement of the jaws. The use of two servo motors also allows adaptation to articles or packages of various dimensions. In some embodiments, an optical sensor is used to detect the position of the package to be sealed, and the movement of the movable carriage assembly and the jaw is altered based on the detected position.

BRIEF DESCRIPTION OF THE DRAWINGS

FIGS. 2A-D illustrate various points in time during the operation of the movable carriage in accordance with the present invention;

DETAILED DESCRIPTION OF THE INVENTION

Figure 1:
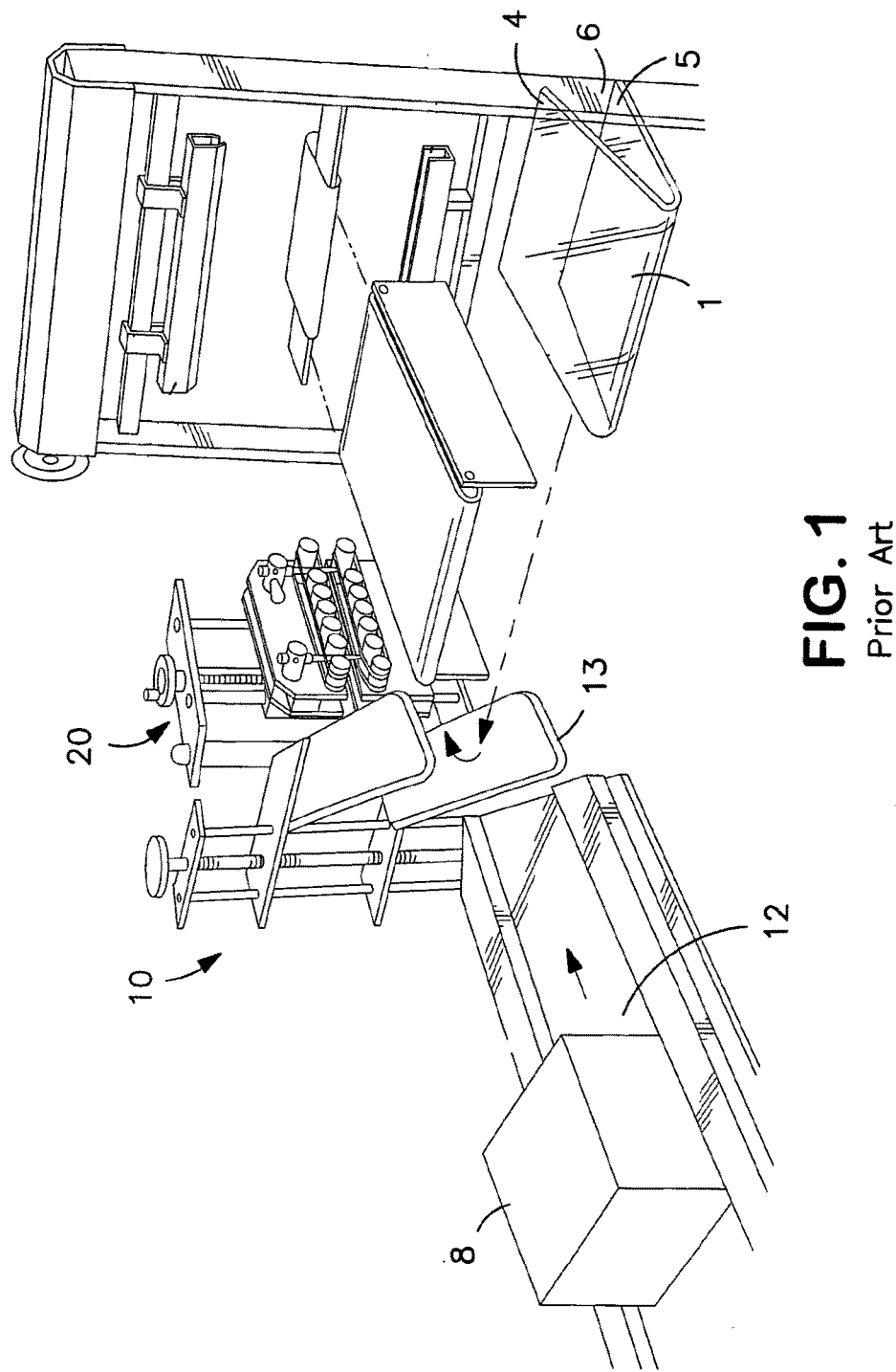
FIG. 1 illustrates a representative side-sealing machine of the prior art.

FIG. 1 illustrates a representative side-sealing machine used to encapsulate or wrap an article in thermoplastic film, as described in U.S. Pat. No. 6,526,728. The machine 10 utilizes a conveyer belt 12 operating at a relatively constant speed to deliver articles 8 that are to be encapsulated. The thermoplastic film 1 is center-folded, such that the side with the fold is closed, while the opposite side 6 is open. On this opposite side, there are two layers of film 4,5, which will later be sealed. This center-folded thermoplastic film 1 is fed from a reel (not shown) that is preferably mounted such that the film is fed perpendicular to the direction of travel of the conveyer belt 12. The film is then inverted and separated by an inverter 13 such that the article is enveloped between the two layers 4,5. At this point, the film 1 on one side of the article is closed, while the opposite side 6 remains open. Also, the film at both the leading and trailing ends of the article are not sealed. Downstream from the inverter is the side-sealing mechanism 20. After proper relative positioning of the article between the layers of the film 4,5, the enveloped article approaches the side-sealing mechanism 20.

The side-sealing mechanism 20 is located on the open side 6 of the enveloped article. The mechanism holds the two layers of film 4,5 together, and guides the layers through the heating and cutting means. It then welds the two layers together, and cuts off the surplus material. The surplus material is pulled away so as not to reattach to the film while it is still at an elevated temperature.

After the film is enveloped around the article and sealed on one side, it continues forward onto a conveyor belt 14. An end seal mechanism 30 is used to form the end seals and to cut the film in the longitudinal direction. The end seal mechanism includes an upper cutting/sealing element 48 disposed above the film 4,5 and a lower cutting/sealing element 88 disposed below the film 4,5. In some embodiments, the end seal mechanism is capable of horizontal movement, as explained in more detail below.

FIGS. 2A-D shows a section of a sealing machine 100 according to one embodiment. This section is preferably disposed downstream of the side-sealing mechanism 20 (see FIG. 1). In this sealing machine 100, packages 101 travel along a conveyor belt 110. At this stage of the process, although not shown for clarity, each package 101 has already been enveloped within a tube of plastic. After being placed in the tube of plastic, the plastic at either end of the package 101 must be cut and sealed. In some embodiments, to create an adequate seal, heat must be applied to the plastic for a period of time, referred to as dwell time. If the conveyor belt 110 were stopped to allow this necessary dwell time, the throughput of the sealing machine 100 would be significantly compromised.

Therefore, in sealing machine 100, the end seal mechanism, which cuts and seals the plastic, is part of a movable carriage assembly 120. The movable carriage assembly 120 includes reciprocating upper cutting/sealing element 121, and reciprocating lower cutting/sealing element 122. The reciprocating upper and lower cutting/sealing elements 121, 122 are also referred to as jaws in this disclosure, and the terms are used interchangeably. Additionally, the movable carriage assembly 120 includes a plurality of rollers 130, which route the conveyor belt 110 around the lower cutting/sealing element 122. The movable carriage assembly 120 is mounted on a linear slide (see FIG. 3), which allows it to smoothly move in the horizontal direction.

In FIG. 2A, the movable carriage assembly 120 is in its furthest downstream position, and the reciprocating upper and lower cutting/sealing elements 121, 122 are in the open position. After this point, the movable carriage assembly 120 moves forward (i.e. upstream) so as to move past the next package 101 travelling on the conveyor belt 110, as shown in FIG. 2B.

Once the movable carriage assembly 120 passes the package 101, it then moves the upper and lower cutting/sealing elements 121,122 so that they move together to cut and seal the plastic on the upstream side of the package 101, as shown in FIG. 2C. To achieve the desired dwell time, the movable carriage assembly 120 then travels downstream (at the same speed as conveyor belt 110) until it reaches the position shown in FIG. 2D. This horizontal travel occurs while the upper and lower cutting/sealing elements 121, 122 are in the closed position. The horizontal travel of the movable carriage assembly 120 from the position shown in FIG. 2C to the position shown in FIG. 2D provides the required dwell time for the upper and lower cutting/sealing elements 121, 122.

Figure 3:
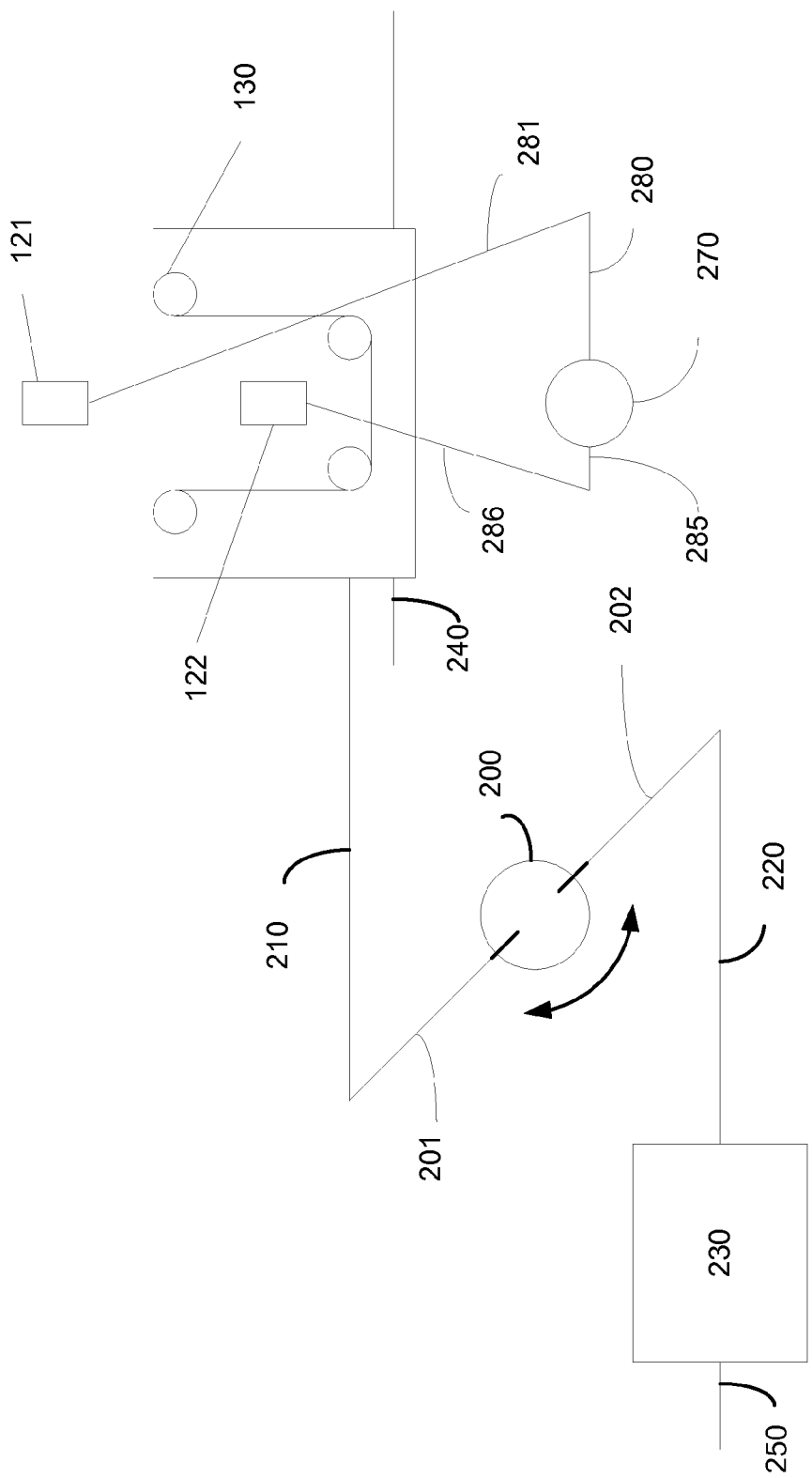
FIG. 3 illustrates the motors associated with the movable carriage shown in FIG. 2.

To achieve the sequence shown in FIGS. 2A-D, several motors are required. FIG. 3 shows a schematic representation of the motors used in one embodiment of the sealing machine 100. A first servo motor 200 is used to create the desired horizontal motion of the movable carriage assembly 120. This first servo motor 200 has a rotating plate having two connection points, preferably diametrically opposed to each other. One connection point of the rotating plate is rigidly coupled with one end of a first radial extender 201. The opposite end of the first radial extender 201 is pivotally attached to the proximate end of a first rod 210. The distal end of this first rod 210 connects to the movable carriage assembly 120. The second connection point is rigidly coupled to a second radial extender 202 at its first end. The second end of the radial extender 202 is pivotally attached to the proximate end of a second rod 220. The distal end of this second rod 220 connects to a counterweight 230. The movable carriage assembly 120 is mounted on a first linear slide 240, which allows it to move horizontally. Similarly, the counterweight 230 is disposed on a second linear slide 250, which also allows the counterweight 230 to move horizontally.

In operation, the first servo motor 200 rotates less than 360°. As it moves counterclockwise, the movable carriage assembly 120 moves to the left, while the counterweight 230 moves to the right. The mass of the counterweight 230 is selected to balance, or offset, the mass of the movable carriage assembly 120. In some embodiments, the mass of the counterweight 230 multiplied by the length of second radial extender 202 is equal to the mass of the movable carriage assembly 120 multiplied by the length of the first radial extender 201. The selection of the mass of the counterweight 230, and the lengths of the first rod 210 and the second rod 220 are implementation decisions and are not limited by the present disclosure. However, the use of a counterweight 230 allows increased speed of the movable carriage assembly 120, as mechanical vibrations are significantly reduced. For example, the sealing machine 100, using the counterweight 230 may be able to operate at a speed in excess of 50 inches per second (or 250 feet per minute).

The amount of rotation of the first servo motor 200 and the length of the radial extenders 201, 202 determine the horizontal distance travelled by the movable carriage assembly 120 and the counterweight 230, respectively. As described above, the horizontal travel distance of the movable carriage assembly 120 and the speed of the conveyor belt 110 determine the dwell time. Thus, for packages 101 that require a long dwell time, the horizontal travel distance of the movable carriage assembly 120 may be extended by increasing the amount of rotation which the first servo motor 200 undergoes. Conversely, for shorter dwell times, the amount of rotation of the first servo motor 200 may be reduced.

In addition, the speed of rotation of the first servo motor 200 determines the speed of horizontal travel of the movable carriage assembly 120. This speed of rotation does not need to be constant. For example, the movable carriage assembly 120 may move quickly upstream (i.e. to the left in FIG. 2) to move past the next package 101. However, it may move slower, such as at the speed of the conveyor belt 110 when moving downstream (i.e. to the right in FIG. 2). In addition, the speed of rotation may vary while moving in a particular direction. For example, while moving downstream, the movable carriage assembly 120 may move at the speed of the conveyor belt 110. However, once the upper and lower cutting/sealing elements 121, 122 separate, the movable carriage assembly 120 may slow down (or speed up) before reversing directions.

Thus, the horizontal movement of the movable carriage assembly 120 is accomplished by rotation of a first servo motor 200. This first servo motor 200 is rigidly coupled with a first end of a first radial extender 201. The second opposite end of the first radial extender 201 is then pivotally coupled to the proximate end of a first rod 210. The distal end of the first rod 210 is coupled to the movable carriage assembly 120. Rotation of the first servo motor 200 translates to linear motion of the movable carriage assembly 120. In some embodiments, the first servo motor is also rigidly attached to a first end of a second radial extender 202, while the second opposite end of the second radial extender 202 is pivotally coupled to a proximate end of a second rod 220. The distal end of the second rod 220 is coupled to the counterbalance 230. The use of this counterbalance 230 may allow high movable carriage assembly speeds.

A second servo motor 270 is used to control the movement of the upper and lower cutting/sealing elements 121, 122. The second servo motor 270 has a rotating plate which has two connection points, preferably diametrically opposed to each other. A first connection point is rigidly attached to a first radially extending bar 280 at a first end. The second opposite end of the radially extending bar 280 is pivotally attached to the proximate end of a first sealing rod 281. The second connection point is rigidly attached to a second radially extending bar 285 at a first end. The second opposite end of the second radially extending bar 285 is pivotally attached to the proximate end of a second sealing rod 286. The distal end of the first sealing rod 281 is in communication with the upper cutting/sealing element 121. The distal end of the second sealing rod 286 is in communication with the lower cutting/sealing element 122.

As can be seen in FIG. 3, the length of travel for the upper cutting/sealing element 121 is determined by the length of the first radially extending bar 280. Similarly, the length of travel for the lower cutting/sealing element 122 is determined by the length of the second radially extending bar 285. In one embodiment, the lower cutting/sealing element 122 may have a much smaller travel than the upper cutting/sealing element 121. For example, the lower cutting/sealing element 122 may have to travel between a first, or sealing, position where the lower cutting/sealing element 122 is in contact with the underside of the plastic film, and a second, or open, position, where it is separated from the plastic film. This second, or open, position is dictated by the amount of separation needed to insure that the lower cutting/sealing element 122 does not inadvertently heat the plastic.

The upper cutting/sealing element 121 similarly has a first, or sealing, position and a second, or open, position. However, the open position of the upper cutting/sealing element 121 is dictated by the height of the package 101 that is being wrapped. Thus, the upper cutting/sealing element 121 may require more vertical movement than the lower cutting/sealing element 122.

However, in some embodiments, the radially extending bars 280, 285 are the same length. In this embodiment, the upper and lower cutting/sealing elements 121, 122 travel the same vertical distance.

In some embodiments, one or both of the radially extending bars 280, 285 may be changeable. For example, when a short package, such as, for example, pizza, is wrapped, a short first radially extending bar 280 may be used. Alternatively, when a tall package is to be wrapped, a longer first radially extending bar 280 may be used.

FIGS. 4A-D shows a view of the operation of the second servo motor 270 in the various stages of operation. For clarity, only the second servo motor 270, the radially extending bars 280, 285, the sealing rods 281, 286 and the upper and lower cutting/sealing elements 121, 122 are illustrated. However, it is understood that these components are all contained within the sealing machine 100 shown in FIG. 3.

In some embodiments, unlike the first servo motor 200, the second servo motor 270 may rotate a full 360°. FIGS. 4A-D show an embodiment where the second servo motor rotates completely around.

Figure 4:
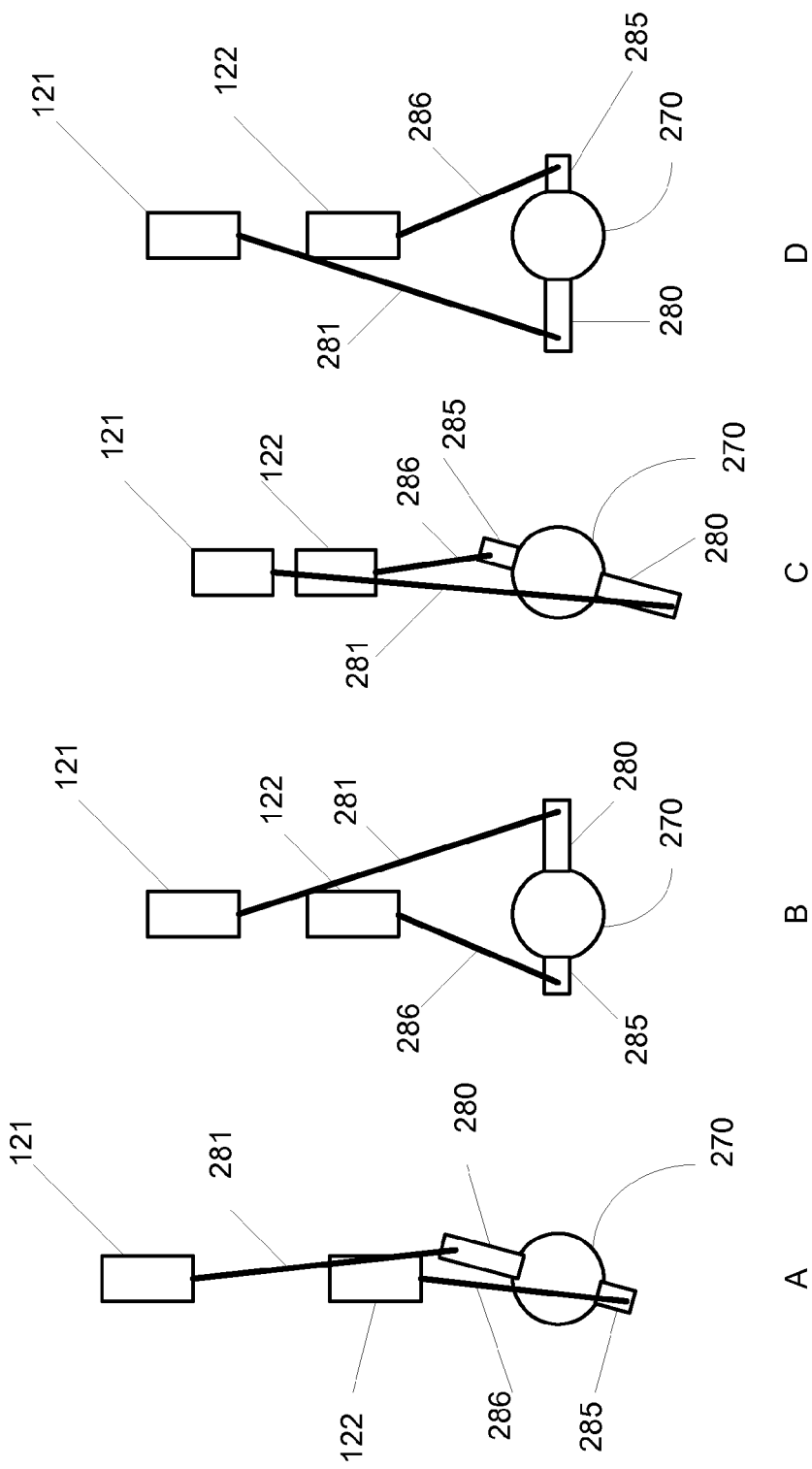
FIGS. 4A-D illustrate various points in time during the operation of the servo motor controlling the cutting/sealing elements.

In FIG. 4A, the second servo motor is shown near the maximum jaw opening. For purposes of accurately describing the sequence, the angle at which the first extending bar 280 is facing vertically upward (i.e. maximum jaw opening) will be referred to as 0°. Angles will increase as the second servo motor 270 rotates in the clockwise direction. As stated above, the maximum opening, or the maximum separation between the upper and lower cutting/sealing elements 121, 122 occurs at 0°. However, to show both sealing rods 281, 286, FIG. 4A shows the second servo motor 270 at an angle of about 20°. Because the first radially extending bar 280 is facing upward, it forces the upper cutting/sealing element 121 upward as well. Conversely, the second radially extending bar 285 is facing downward and forces the lower cutting/sealing element 122 downward as well.

FIG. 4B shows the second servo motor 270 as it reaches a 90° angle of rotation. As the second servo moves from 0° to 180°, the upper and lower cutting/sealing elements 121, 122 continue to move closer to one another.

FIG. 4C shows the second servo motor 270 at an angle slightly greater than 180°. At an angle of rotation of 180°, the upper and lower cutting/sealing elements 121, 122 are in contact with each other (allowing for the plastic film disposed between the elements), and are sealing the plastic film. In some embodiments, the second servo motor 270 may remain at the 180° position while the movable carriage assembly 120 moves downstream (see FIGS. 2C and 2D).

As the second servo motor 270 continues rotating, the upper and lower cutting/sealing elements 121, 122 separate again. FIG. 4D shows the position of the various components when the second servo motor 270 is at an angle of 270°. As the second servo motor 270 continues rotating, it returns to the position shown in FIG. 4A, and the sequence repeats.

The sequence shown in FIGS. 4A-D shows an embodiment where complete rotation is accomplished. However, it is noted that, in other embodiments, the second servo motor 270 may rotate back and forth like the first servo motor 200. For example, the range of rotation of the second servo motor 270 may be between 180° (i.e. the angle at which the upper and lower cutting/sealing elements 121, 122 are in contact with each other) and a second angle, based on the desired maximum height of the upper cutting/sealing element 121. For example, assume the first radially extending bar 280 has a length x, and the first sealing rod 181 has a length y. The height of the upper cutting/sealing element 121 is given by $y*\cos\theta + \sqrt{(x^2 - (y*\sin\theta)^2)}$, where $\theta$ is the angle of rotation. The maximum height is achieved when $\theta$ is 20°, while the minimum height is achieved when $\theta$ is 180°. Therefore, in another embodiment, a value of $\theta$ is selected based on the known lengths of the first radially extending bar 280 and the first sealing rod 181. This value of $\theta$ is selected based on the desired maximum height of the upper cutting/sealing element. The vertical jaw movement routine, described below, would then operate between this value of $\theta$ and 180°.

Like the first servo motor 200, the second servo motor 270 may be rotated at constant or non-uniform angular velocity. For example, the second servo motor 270 may be controlled so that it spends most of its time near rotation angles of 0° (fully open) and 180° (fully closed).

Figure 5:
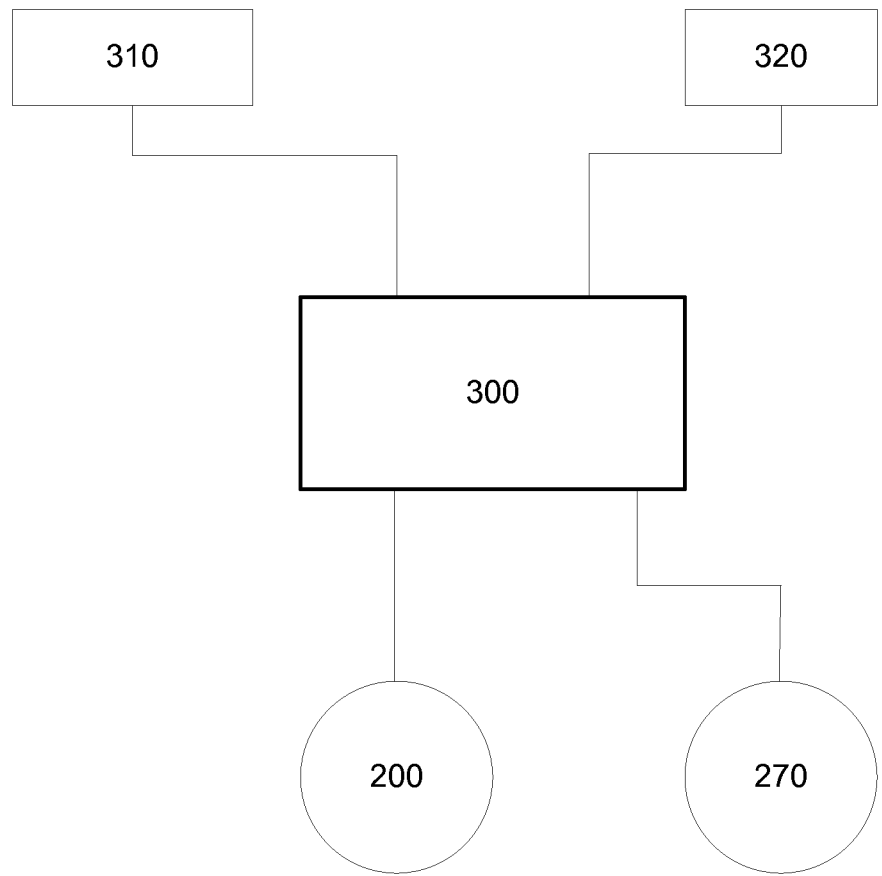
FIG. 5 illustrates a representative schematic diagram of the electronics in the sealing machine.

FIG. 5 shows a representation of a portion of the electronics associated with the sealing machine 100. The electronics system includes a controller 300, a user interface 310, one or more optical sensors 320, a first servo motor 200 and a second servo motor 270. The electronics system may also include additional components, such as a motor that controls the speed of the conveyor belt 110, and other sensors.

The controller 300 may include a processing unit, such as an embedded processor, a computer, a PID controller, or another type of computing device. This processing unit is in communication with a memory element. This memory element contains the instructions, which when executed, perform the functions described in this disclosure. This memory element may be non-volatile, such as ROM, FLASH ROM, optical disk, magnetic disk or the like. Alternatively, the memory element may be volatile, such as RAM or DRAM. In some embodiments, the memory element may comprise both a non-volatile portion, such as for the storage of instructions, and a volatile portion, for the storage of temporary data.

The controller 300 is in communication with the first servo motor 200 and the second servo motor 270. In some embodiments, the controller 300 includes an integrated digital to analog (D/A) converter, so as to supply the required current and/or voltage to the servo motors 200, 270. For example, the polarity of the voltage (positive or negative) may indicate the direction of rotation of a particular servo motor, while the magnitude of the voltage may indicate the speed of rotation. Of course, other interfaces can be utilized to allow the controller 300 to communicate with the servo motors 200, 270, and the present disclosure is not limited to any particular embodiment.

The controller 300 is also in communication with a user interface 310. This user interface may include an input device, such as buttons, a keyboard or a touchscreen. In addition, the user interface may include an output device, such as a video display.

Using the user interface 310, an operator may supply necessary operating parameters to the controller 300. For example, the operator may supply information such as the speed at which the conveyor belt should travel. Additionally, information such as the type of plastic used (or the amount of dwell time required) may be input. In some embodiments, additional information, such as the size (i.e. the height and length) of the packages to be wrapped, may be input by the user.

In some embodiments, the controller 300 may be in communication with one or more optical sensors 320. These sensors may provide information to the controller 300. For example, an optical sensor 320 may be disposed on or near the conveyor belt 110. This optical sensor 320 may provide an indication to the controller 300 of the presence of a package on the conveyor belt 110. In some embodiments, the optical sensor 320 may also be used to determine the length and/or height of the package 101 (instead of providing this information via the user interface).

Based on the size of the package (as determined either by optical sensor 320 or via user interface 310), the desired dwell time, and the speed of the conveyor belt, the controller 300 can manipulate the servo motors 200, 270 to achieve the desired result.

Figure 6:
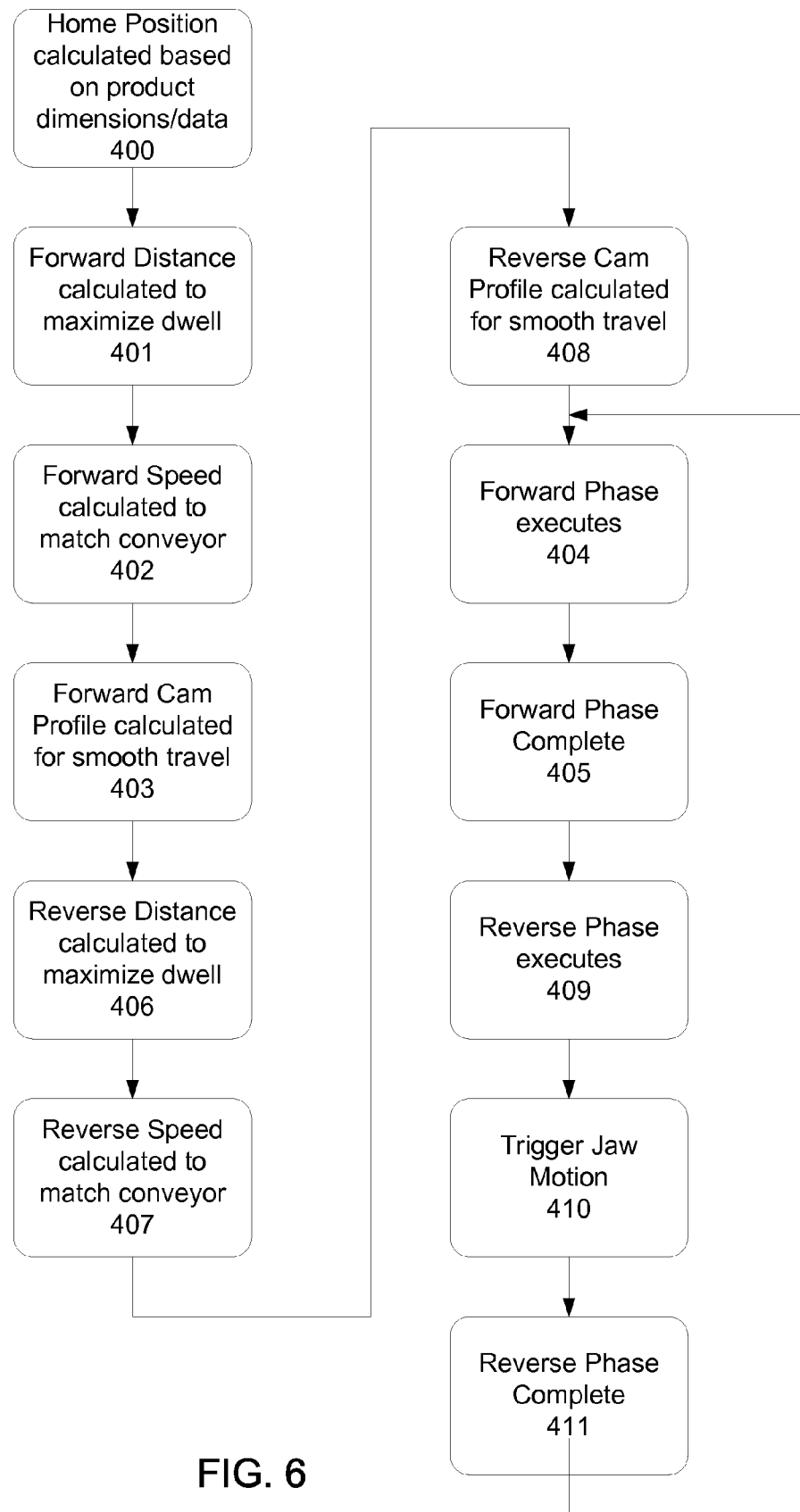
FIG. 6 shows a flowchart showing the operation of the horizontal movement of the carriage according to one embodiment.

FIG. 6 shows a first embodiment of a flowchart used by the controller 300 to control the first servo motor 200. This process may be referred to as the horizontal carriage movement routine and may be embodied in instructions contained in a memory element contained within the controller 300. As described above, the first servo motor 200 controls the horizontal motion of the movable carriage assembly 120. In this diagram, "forward" refers to the upstream direction (i.e. the direction from which packages 101 arrive). "Reverse" refers to the downstream direction (i.e. the direction that the packages 101 travel in along the conveyor 110). In step 400, the system becomes aware of the package dimensions. This may be done in a plurality of ways. In one embodiment, as described above, the package dimensions are entered using the user interface 310. In other embodiments, the package dimensions are determined using sensors 320. The size of the package is used to determine the amount of horizontal travel that the movable carriage assembly 120 must undergo. For example, a smaller package may require less horizontal travel. Furthermore, the height of the package may also effect the determination of the extent of horizontal travel. Based on the package dimensions, the home position of the movable carriage assembly 120 is determined (step 400). In addition, the forward, or upstream, distance is determined (step 401). The forward speed is also determined (step 402). This speed may be related to the speed at which the conveyor belt 110 is travelling. In other words, assume the conveyor belt 110 is moving at a speed of x inches/sec, the carriage horizontal distance is y inches, and the spacing between products is z inches. In this case, the horizontal distance (y) plus the travel of the conveyor belt (x multiplied by time) must equal the product spacing (z). When rewritten, this relationship shows that the forward speed of the movable carriage assembly 120 is related to both the speed of the conveyor belt 110 and the dimension of the products. The controller 300 also has the ability to rotate the first servo motor 200 at a non-uniform rate. This allows the creation of a cam profile (step 403). For example, the movable carriage assembly's speed in the forward, or upstream, direction, may vary as the movable carriage assembly 120 is being moved. This may be done to insure smooth travel and a matching to the speed of the conveyor belt 110 at the two ends of travel. In addition, the reverse, or downstream, distance is calculated (step 406), as is the reverse speed (step 407) and the reverse cam profile (step 408).

After all of these parameters have been calculated, the controller 300 may execute the servo motor control steps of the horizontal carriage movement routine. First, the movable carriage assembly 120 is moved upstream (step 404) using the distance, velocity and cam profile determined in steps 401, 402 and 403. When the movable carriage assembly 120 achieves the desired amount of travel, the forward phase is complete (step 405). At this time, the controller 300 reverses the direction of the servo motor and executes the reverse phase (step 409) until the movable carriage assembly 120 returns to the home position. At this point, the reverse phase is complete (step 411).

The flowchart of FIG. 6 shows a trigger being actuated (step 410) during the reverse phase, between steps 409 and step 411. However, it is noted that this trigger may be actuated at any point during the movable carriage assembly's motion.

Figure 7:
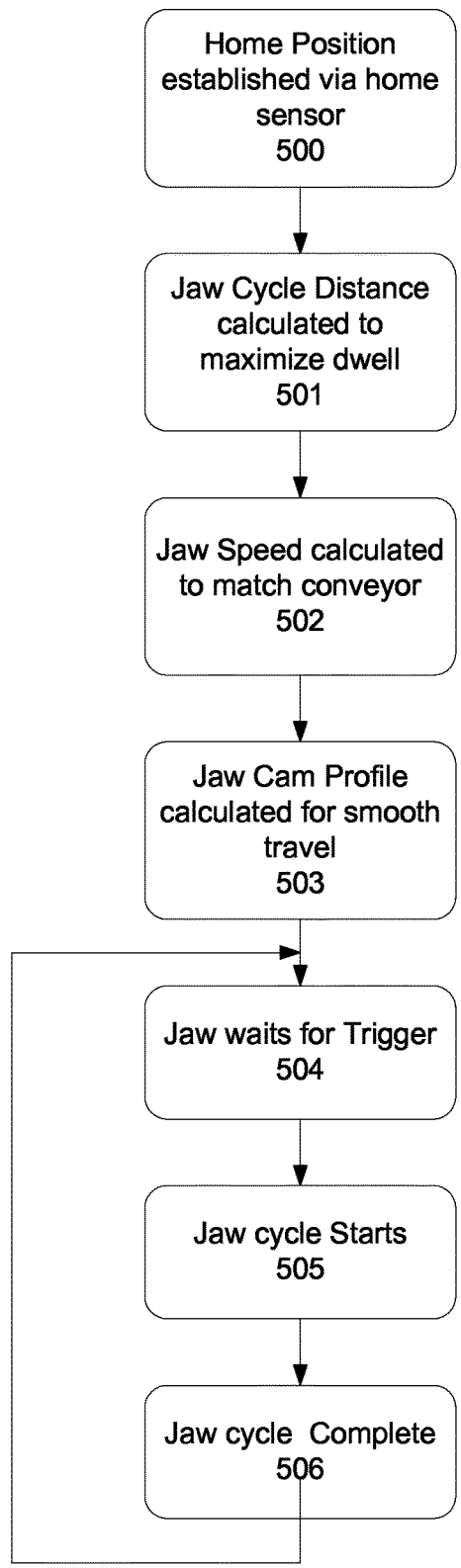
FIG. 7 shows a flowchart showing the operation of the vertical movement of the jaws according to one embodiment.

FIG. 7 shows a simplified flowchart of the jaw motion, which is controlled by the second servo motor 270. Like the flowchart of FIG. 6, this flowchart is executed by the controller 300. The vertical jaw movement routine begins by determining a home position, such as by using one of the optical sensors 320, as shown in step 500. In steps 501 and 502, the controller 300 determines the jaw distance and jaw speed. For example, if the product spacing is defined as z inches, the jaw must execute one complete cycle (jaws open/close) within those z inches. The conveyor belt 110 is also moving, which determines the time during which the jaws must execute this complete cycle. Thus, this helps determine the jaw speed (step 502). In some embodiments, the distance and speed are calculated based on a number slightly less than the actual product spacing (z). For example, the routine may calculate jaw cycle distance, in step 501, to be z−1 inches. This allows the controller 300 some flexibility in creating the cam profile (step 503). In this way, the controller 300 may be able to slow the second servo when the jaws are nearly closed to maximize dwell time.

Once these parameters are determined, the controller 300 executes the servo motor control steps of the vertical jaw movement routine. First, the controller 300 waits for a trigger signal from the horizontal carriage movement routine (see FIG. 6, step 410). Once this is received, the jaw cycle starts (step 505). The controller 300 moves the second servo motor 270 through its entire 360° rotation, using the speed and cam profile determined in steps 502 and 503. Once the second servo motor 270 has completed its 360° rotation, the jaw cycle is complete (step 506). The controller 300 then returns to step 504 and awaits the next trigger from the horizontal carriage movement routine.

It should be noted that the second servo motor 270 may be moved using any desired cam profile. For example, in some embodiments, the second servo motor 270 may be stopped during a portion of its rotation, such as while the jaws are closed. In another embodiment, the cam profile may slow the rotation of the second servo motor 270 significantly while the jaws are near the closed position, without actually even stopping the rotation of the second servo motor 270.

FIGS. 6 and 7 illustrate simplified flowcharts showing the interaction between the two servo motors 200, 270. In the embodiment of FIGS. 6 and 7, the product spacing is assumed to be constant and error free. In other words, the various parameters, such as forward and reverse speed, forward and reverse distance, forward and reverse cam profile, jaw distance, jaw speed and jaw cam profile, are calculated one time based on ideal conditions, and never changed during actual operation.

In other embodiments, the controller 300 uses other information to fine tune these parameters continuously during the execution of the horizontal carriage movement routine and the vertical jaw movement routine.

Figure 8:
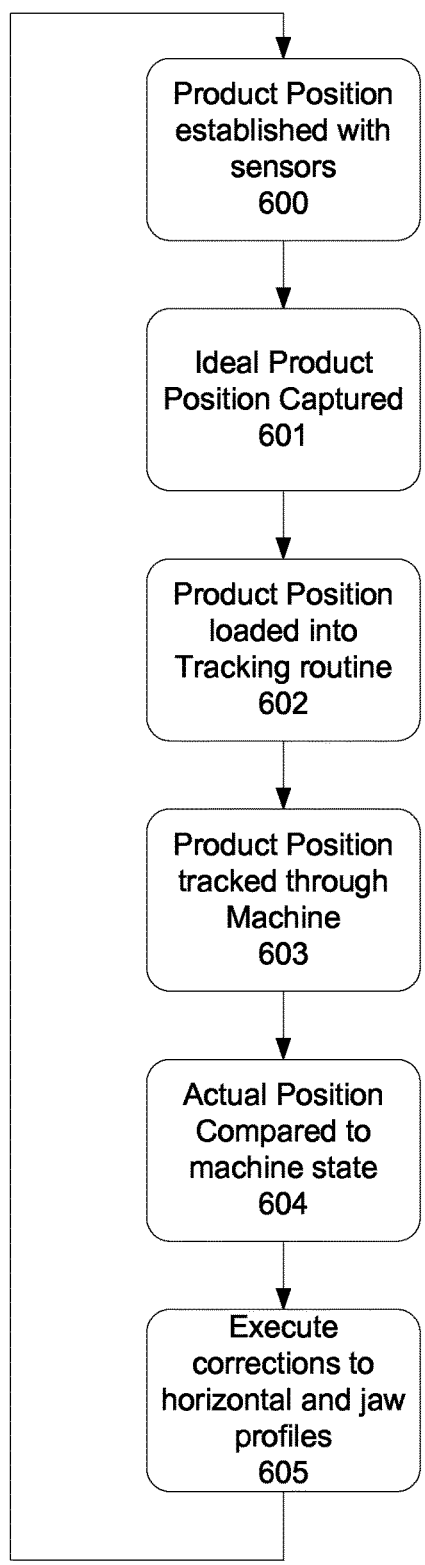
FIG. 8 shows a flowchart which allows dynamic changes to the horizontal and vertical movement based on product placement.

FIG. 8 illustrates a flowchart that may be executed by the control 300 to determine actual product spacing and position. In this embodiment, one or more sensors 320 may be used to provide information to the control 300. In some embodiments, these sensors 320 may comprise optical sensors, but other sensors, such as pressure sensors may also be used. For example, the inlet belt may contain a plurality of pushable pegs, such that when a package is placed on a particular peg, that peg is depressed. This depression serves as an indication to the controller 300 of the presence of a package at that location. In other embodiments, an optical sensor 320 is placed near the conveyor belt 110 to determine the start and end of each package.

An ideal product position is then determined (step 601) based on this actual product position. Based on the operation of the machine and the speed of the conveyor belt 110, the position of the package 101 is tracked through the machine (step 603). In some embodiments, a separate product tracking routine (step 602) is used to monitor and estimate the position of each package as it goes through the system. As the product enters the conveyor belt 110, its actual position is compared to the current state of the machine (step 604). For example, the package position is compared to the actual positions of the movable carriage assembly 120 and the jaws 121, 122. If the package 101 is behind where it is expected to be, the horizontal carriage movement routine and the vertical jaw movement routine must slow the movement of the movable carriage assembly 120 and the jaws 121, 122, respectively. Conversely, if the package 101 is ahead of the expected position, the horizontal carriage movement routine and the vertical jaw movement routine must accelerate the movement of the movable carriage assembly 120 and the jaws 121, 122, respectively.

In some embodiments, an optical sensor 320 is employed near the conveyor belt 110. This optical sensor 320 transmits information to the controller 300 so that the actual position of the package 101 is exactly known as the package approaches the movable carriage assembly 120. In other embodiments, optical sensors 320 are not used near the conveyor belt 110. In this case, the controller 300 uses the estimated package position as determined by the product tracking routine (steps 602, 603).

After the position of the package 101 is determined (either using an optical sensor 320 or estimated by the tracking routine), it is then compared to the actual state of the movable carriage assembly 120 and the jaws 121, 122. The controller 300 determines any corrections that need to be made to the horizontal carriage parameters (see FIG. 6, steps 401, 402, 403, 406, 407 and 408) and to the vertical jaw parameters (see FIG. 7, steps 501, 502 and 503). The horizontal carriage movement routine and the vertical jaw movement routine then execute based on these newly calculated parameters.

Figure 9:
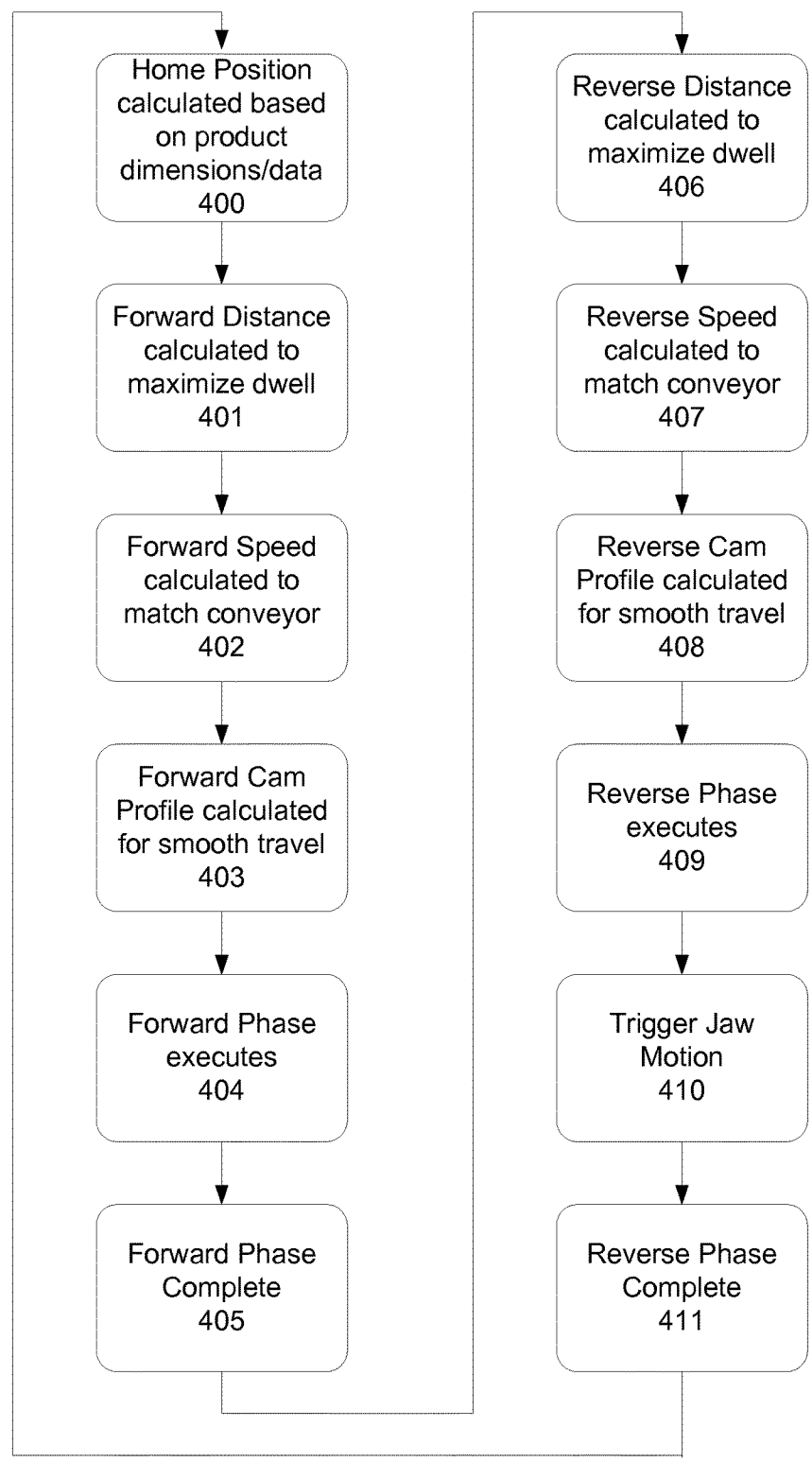
FIG. 9 shows a flowchart showing the operation of the horizontal movement of the carriage according to a second embodiment.

In order to dynamically track the individual packages 101, the parameters used in the horizontal carriage movement routine and the vertical jaw movement routine must be continuously updated. FIG. 9 shows a second embodiment of the horizontal carriage movement routine. In this embodiment, the steps described in FIG. 6 are all included, however, their order of execution is changed. In this embodiment, the various horizontal carriage parameters (steps 401, 402, 403, 406, 407 and 408) are calculated each time the horizontal carriage movement routine is executed. In other words, the operation of the first servo motor 200 is adjusted for each package 101 that travels on the conveyor belt 110. In this way, deviations in the position of the packages can be easily accommodated.

Figure 10:
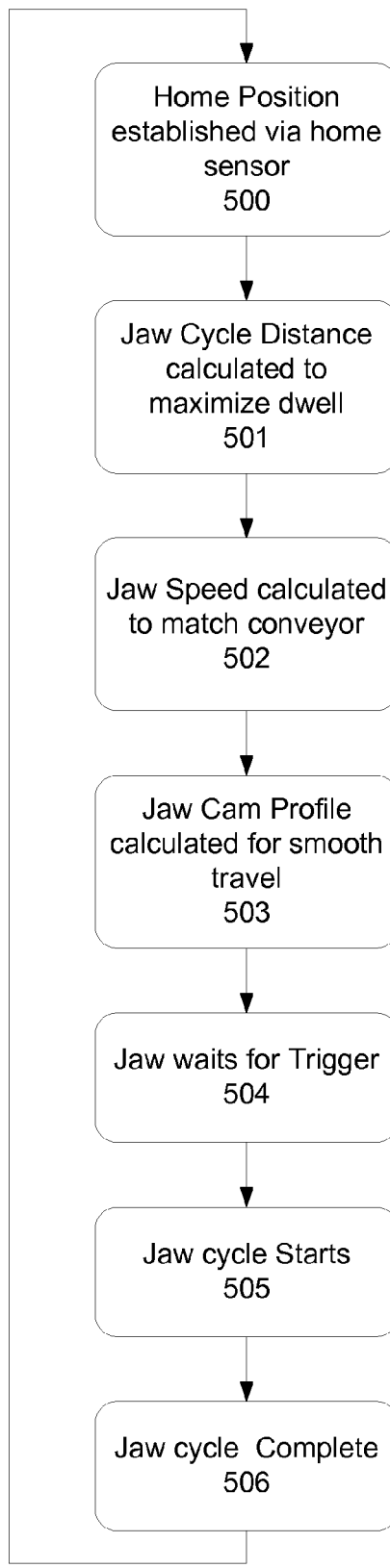
FIG. 10 shows a flowchart showing the operation of the vertical movement of the jaws according to a second embodiment.

Similarly, FIG. 10 shows a second embodiment of the vertical jaw movement routine. In this embodiment, each step, including the parameter calculation steps (steps 500-503) is executed each rotation of the second servo motor 270. As described above, in this way, deviations in the position of the packages can be easily accommodated.

The use of two servo motors 200, 270 has several advantages over prior art systems. First, the use of two servo motors 200, 270 eliminates the mechanical linkages that previously existed between the two directions of travel. In this way, horizontal and vertical cam profiles can be independently developed and modified. This allows different dwell times to be easily programmed into the system. It also allows infinite variation of forward carriage speed, reverse carriage speed, forward cam profile, reverse cam profile, carriage horizontal travel, jaw cam profile, and jaw speed. This makes possible the wrapping of any dimensioned package.

In addition, the use of an optical sensor in conjunction with these servo motors allows the system to dynamically adapt to the placement of each package as it approaches the movable carriage assembly 120. Missing or slightly misplaced packages can be accommodated without affecting throughput. This is not possible with a system that uses mechanical linkages to achieve the horizontal and vertical motion.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. These other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A sealing machine comprising:
a movable carriage assembly, comprising:
an upper cutting/sealing element; and
a lower cutting/sealing element;
a first servo motor to control horizontal movement of said movable carriage assembly;
a counterbalance positioned so as to move in an opposite horizontal direction as said movable carriage assembly;
a second servo motor to control the vertical movement of said upper and lower cutting/sealing elements; and
a first rod having a proximate end and a distal end, wherein said proximate end of the first rod is pivotally coupled to said first servo motor and said distal end is attached to said movable carriage assembly,
wherein rotation of said first servo motor translates to horizontal movement of said movable carriage assembly.

2. The sealing machine of claim 1, further comprising:
a first radial extender rigidly attached to said first servo motor at a first end;
wherein said proximate end of said first rod is pivotally attached to a second end of said first radial extender.

3. The sealing machine of claim 2, further comprising:
a second radial extender rigidly attached to said first servo motor at a first end;
a second rod, having a proximate and distal end, pivotally attached to a second end of said second radial extender at said proximate end and attached to said counterbalance at said distal end,
wherein rotation of said first servo motor translates to horizontal movement of said counterbalance in a direction opposite that of said movable carriage assembly.

4. The sealing machine of claim 1, further comprising a controller in communication with said first servo motor and said second servo motor, such that said controller controls the horizontal movement of said movable carriage assembly and the vertical movement of said upper and lower cutting/sealing elements.

5. The sealing machine of claim 4, wherein said controller controls said horizontal movement by controlling a forward speed of said movable carriage assembly using a forward cam profile and controlling a reverse speed of said movable carriage assembly using a reverse cam profile, wherein said forward speed, said forward cam profile, said reverse speed and said reverse cam profile are based on dimensions of a package to be sealed.

6. The sealing machine of claim 5, wherein said controller controls said vertical movement by controlling a jaw speed of said upper and lower cutting/sealing elements using a jaw cam profile, wherein said jaw speed and said jaw cam profile are based on dimensions of a package to be sealed.

7. The sealing machine of claim 6, further comprising a conveyor belt to move packages through said sealing machine and an optical sensor disposed proximate said conveyor belt so as to detect the position of a package on said conveyor belt, said optical sensor in communication with said controller.

8. The sealing machine of claim 7, wherein said controller modifies at least one of said forward speed, said reverse speed, said forward cam profile, said reverse cam profile, said jaw speed and said jaw cam profile based on said detected position of said package.

9. A sealing machine comprising:
a movable carriage assembly, comprising:
an upper cutting/sealing element; and
a lower cutting/sealing element;
a counterbalance;
a first servo motor to control horizontal movement of said movable carriage assembly and said counterbalance, such that said movable carriage assembly and said counterbalance are adapted to move in opposite horizontal directions;
a second servo motor to control the vertical movement of said upper and lower cutting/sealing elements;
a first sealing rod having a proximate end and a distal end, wherein said proximate end of said first sealing rod is pivotally coupled to said second servo motor and said distal end of said first sealing rod is attached to said upper cutting/sealing element; and
a second sealing rod having a proximate end and a distal end, wherein said proximate end of said second sealing rod is pivotally coupled to said second servo motor and said distal end of said second sealing bar is attached to said lower cutting/sealing element;
wherein rotation of said second servo motor translates to vertical movement of said upper and lower cutting/sealing elements.

10. The sealing machine of claim 9, further comprising:
a first radially extending bar rigidly attached to said second servo motor at a first end, wherein said proximate end of said first sealing rod-is pivotally attached to a second end of said first radially extending bar; and
a second radially extending bar rigidly attached to said second servo motor at a first end, wherein said proximate end of said second sealing rod-is pivotally attached to a second end of said second radially extending bar.

11. The sealing machine of claim 10, wherein said first sealing rod, said second sealing rod, said first radially extending bar and said second radially extending bar are sized so that said second servo motor undergoes 360° of rotation.

12. The sealing machine of claim 9, further comprising a controller in communication with said first servo motor and said second servo motor, such that said controller controls the horizontal movement of said movable carriage assembly and said counterbalance and the vertical movement of said upper and lower cutting/sealing elements.

13. The sealing machine of claim 12, wherein said controller controls said horizontal movement by controlling a forward speed of said movable carriage assembly using a forward cam profile and controlling a reverse speed of said movable carriage assembly using a reverse cam profile, wherein said forward speed, said forward cam profile, said reverse speed and said reverse cam profile are based on dimensions of a package to be sealed.

14. The sealing machine of claim 13, wherein said controller controls said vertical movement by controlling a jaw speed of said upper and lower cutting/sealing elements using a jaw cam profile, wherein said jaw speed and said jaw cam profile are based on dimensions of a package to be sealed.

15. The sealing machine of claim 14, further comprising a conveyor belt to move packages through said sealing machine and an optical sensor disposed proximate said conveyor belt so as to detect the position of a package on said conveyor belt, said optical sensor in communication with said controller.

16. The sealing machine of claim 15, wherein said controller modifies at least one of said forward speed, said reverse speed, said forward cam profile, said reverse cam profile, said jaw speed and said jaw cam profile based on said detected position of said package.

* * * * *